(12) United States Patent
Windl

(10) Patent No.: US 6,898,466 B2
(45) Date of Patent: May 24, 2005

(54) PROGRAMMING DEVICE AND A METHOD FOR GENERATING A CONTROL PROGRAM

(75) Inventor: Helmut Windl, Peisig (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/453,500

(22) Filed: Jun. 4, 2003

(65) Prior Publication Data

US 2004/0073320 A1 Apr. 15, 2004

Related U.S. Application Data

(63) Continuation of application No. PCT/DE01/04548, filed on Dec. 4, 2001.

(30) Foreign Application Priority Data

Dec. 4, 2000 (DE) .......................................... 100 60 206

(51) Int. Cl.⁷ .............................................. G05B 11/01
(52) U.S. Cl. ............................. 700/18; 700/23; 700/86; 700/89; 700/160; 700/181; 700/253; 700/264; 714/100; 714/108; 714/126
(58) Field of Search .............................. 700/17, 18, 23, 700/83, 86, 87, 88, 89, 160, 181, 264, 253, 245; 717/100, 108, 126

(56) References Cited

U.S. PATENT DOCUMENTS

| | | | | |
|---|---|---|---|---|
| 4,199,814 A | * | 4/1980 | Rapp et al. .................. 700/180 |
| 5,051,676 A | * | 9/1991 | Seki et al. .............. 318/568.24 |
| 5,456,691 A | | 10/1995 | Snell | |
| 5,800,473 A | | 9/1998 | Faisandier | |
| 5,910,895 A | * | 6/1999 | Proskauer et al. ........... 700/121 |
| 5,970,243 A | * | 10/1999 | Klein et al. .................. 717/113 |
| 6,285,948 B1 | * | 9/2001 | Takagi et al. ................ 701/115 |
| 6,411,858 B1 | * | 6/2002 | Sakurai et al. ................ 700/18 |
| 2002/0059567 A1 | * | 5/2002 | Minamide et al. .......... 717/151 |
| 2002/0073094 A1 | | 6/2002 | Becker et al. | |

FOREIGN PATENT DOCUMENTS

WO  WO 00/54118 A1  9/2000

OTHER PUBLICATIONS

"Simatic Industrie Software 8", Siemens ST 70 1997.

* cited by examiner

*Primary Examiner*—Ramesh Patel
(74) *Attorney, Agent, or Firm*—Sughrue Mion, PLLC

(57) ABSTRACT

A programming device with a software tool provided to create a control program based on a control problem to be solved, e.g., controlling a technical process. A user is given information on software blocks (A–G) that are stored in the programming device (1) and/or in an automation device (4). In particular, the software blocks are configured for the programming device to recognize those software blocks that are stored in the programming device (1) and those that are stored in the automation device (4). The programming device, by performing a comparison, displays the comparison result for a user of the programming device.

10 Claims, 2 Drawing Sheets

PROGRAMMING DEVICE AND A METHOD FOR GENERATING A CONTROL PROGRAM

This is a Continuation of International Application PCT/DE01/04548, with an international filing date of Dec. 4, 2001, which was published under PCT Article 21(2) in German, and the disclosure of which is incorporated into this application by reference.

FIELD OF AND BACKGROUND OF THE INVENTION

The invention relates to a programming device with a software tool configured to create a control program that solves a control problem to be solved.

Siemens Catalogue ST 70, Chapter 8, 1997 edition, which is incorporated herein by reference, describes a software tool with fully programmed solutions that can be called by an application program. These solutions, in the form of so-called standard function blocks, e.g. standard function blocks in the form of controllers or pulse shapers, can in turn be combined into higher-level function blocks by a user. Such higher-level function blocks, e.g. function blocks in the form of motor controls, are part of a control program that can be transmitted to an automation device and used to control a technical process.

OBJECTS OF THE INVENTION

One object of the present invention is to provide a programming device of the above-described type that makes information on software blocks stored in the programming device and/or in an automation device available to a user.

SUMMARY OF THE INVENTION

This and other objects are attained, according to one formulation of the invention, by a programming device with a software tool for creating a control program in accordance with a control problem to be solved. A plurality of software blocks are stored in the programming device, the control program includes at least one of these software blocks, and the control program is configured to be transmitted from the programming device to an automation device, to be stored in the automation device, and to be run on the automation device in order to control a technical process. The programming device includes means for recognizing the software blocks that are stored in the programming device, means for recognizing the software blocks that are stored in the automation device, means for comparing the software blocks stored in the programming device with the software blocks stored in the automation device, and means for displaying the result of the comparison.

The invention supports a user in creating and maintaining a control program. The software blocks of the control program can be blocks in the form of loadable objects, e.g. so-called organization and/or data blocks and/or system function call and/or block and/or function call and/or block.

In one preferred embodiment of the invention, a user recognizes which software blocks for creating a control program are stored in the programming device and which of these software blocks have already been stored in the automation device. It is not necessary to transfer all the control program software blocks to the automation device but only the missing software blocks displayed on the programming device. This saves time in loading the blocks into the automation device.

In a further preferred embodiment of the invention, a user recognizes which of the software blocks stored in the programming device and the automation device match. Thus, it is readily apparent which modules still have to be loaded into the programming device and/or the automation device to be able to create a control program according to a control problem to be solved.

Because the software blocks stored in the automation device can be displayed during open-loop control and because the blocks that are not stored in the programming device are identified, a user can recognize whether software blocks are stored in the automation device that do not belong to the control program. Such software blocks, e.g. blocks in the form of so-called organization blocks, which the operating system of the automation device starts when certain events occur, can be due, for example, to earlier program changes.

BRIEF DESCRIPTION OF THE DRAWINGS

The invention and its embodiments and advantages will now be described in greater detail, by way of example, with reference to an embodiment depicted in the drawing in which.

DETAILED DESCRIPTION OF THE PREFERRED EMBODIMENTS

Figure 1:
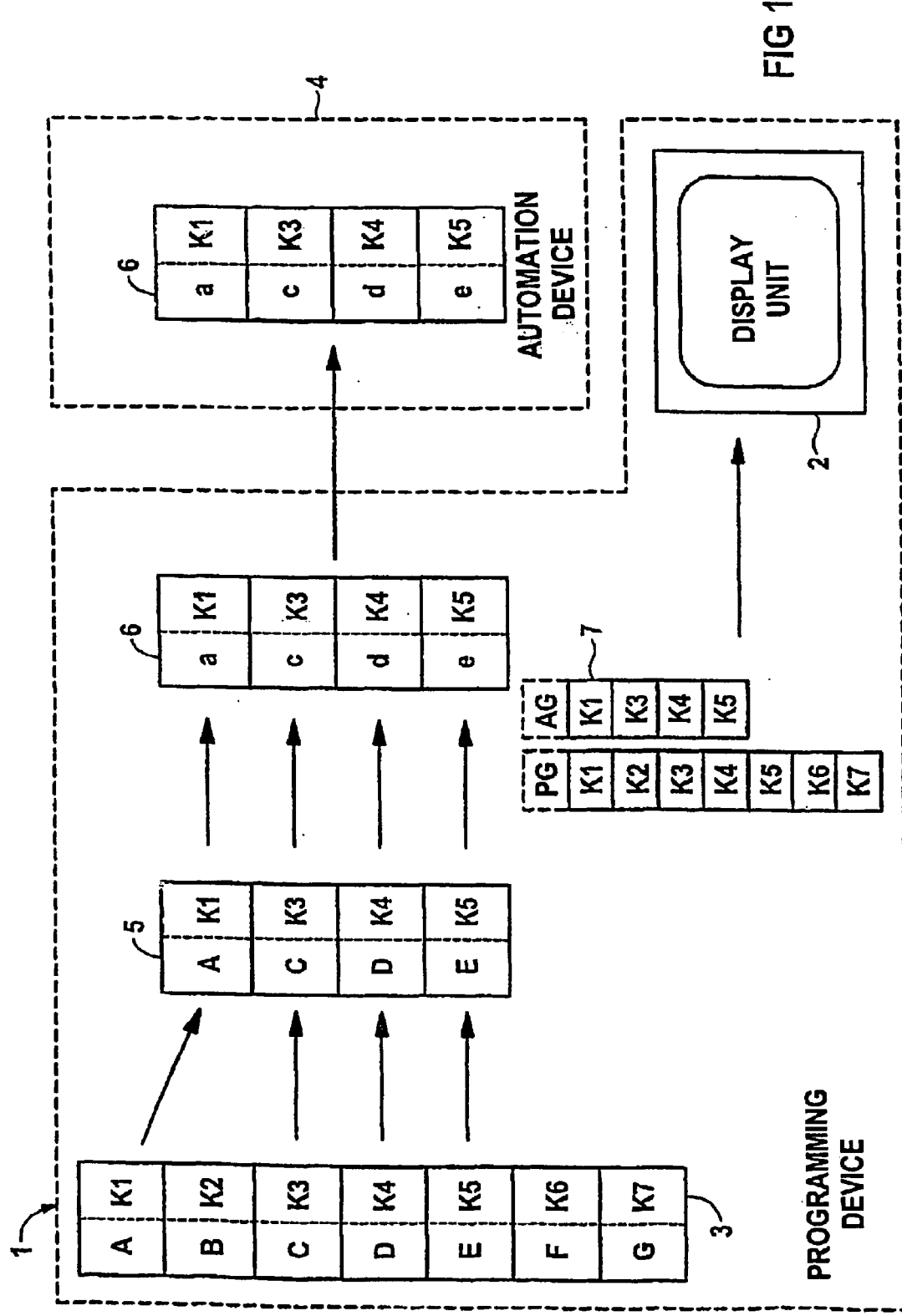
FIG. 1 is a schematic representation of a programming device linked to an automation device.

In FIG. 1, 1 identifies a programming device, which has a display unit 2 and in which software blocks A, B, . . . G of a block library 3 are stored in a memory of the programming device. The software blocks A, B, . . . represent blocks in a programming language source code, which can be translated into corresponding software blocks a, c, . . . of a machine language of an automation device 4. The programming device 1 is linked to the automation device 4, in which a control program for controlling a technical process created by the programming device 1 is stored.

It is assumed that a user creates a control program 5 on the programming device 1 in accordance with a control problem to be solved. For this purpose a software tool is provided which is configured to run on the programming device. The control program 5, referenced for purposes of illustration here, includes four source code blocks A, C, D, E, which the software tool generates from a plurality of source code blocks A, B, . . . , G of the block library 3. The software tool assigns an identifier K1, K2, . . . , K7 to these software blocks. The software tool translates these four source code blocks A, C, D, E into a machine code with blocks a, c, d, e which is readable by the automation device, and transmits this machine-readable control program 6 to the automation device 4. Due to the identifiers K1, K2, . . . , K7, it is possible at any time, in online as well as offline operation of the automation device 4, to recognize not only the software blocks stored in the programming device 1 but also those stored in the automation device 4. These software blocks are preferably displayed on the display unit 2 e.g. in the form of a table 7. In this table, the blocks stored in the programming device 1 are displayed in a column PG and those stored in the automation device are displayed in a column AG. A block recognition program, for example, queries the identifiers of the software blocks stored in the programming device 1 and in the automation device 4, compares the identifiers and displays the results of this comparison on the display unit 2.

Figure 2A:
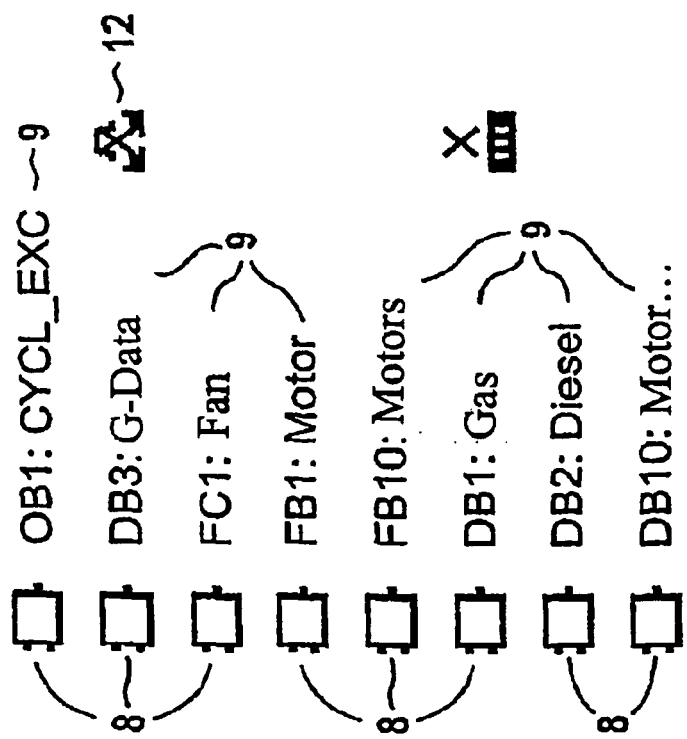
FIGS. 2A and 2B are a first and a second view of software blocks.
Figure 2B:
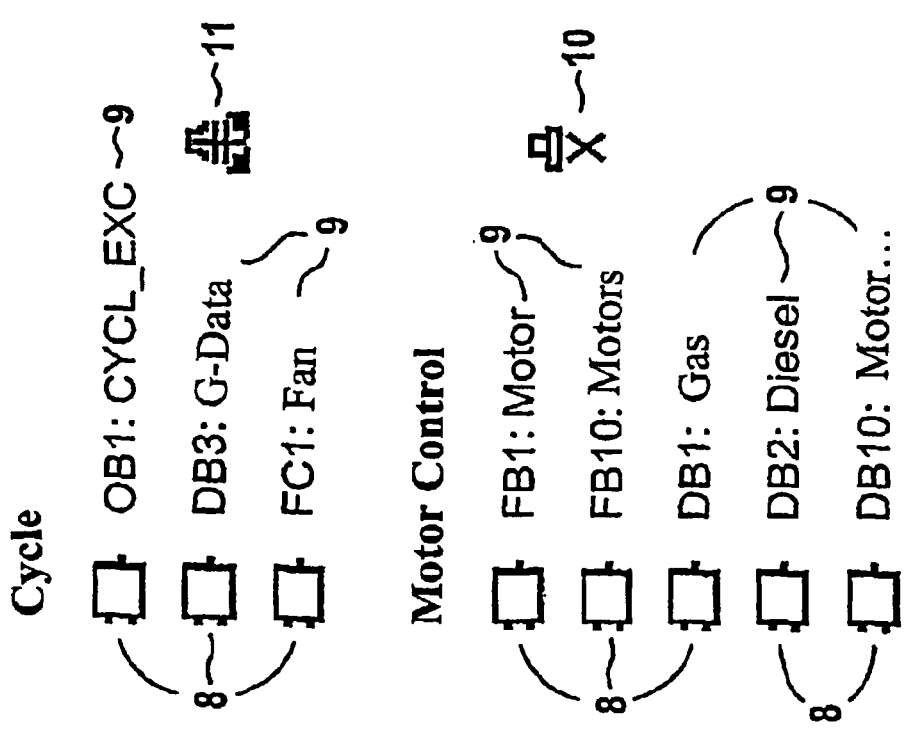

Reference is now made to FIG. 2, in which software blocks OB1, DB3, FC1, FB1, FB10, DB1, DB2, DB10 are displayed in a first view, depicted in FIG. 2A, in the form of an offline view and in a second view, depicted in FIG. 2B, in the form of an online view. The software blocks are depicted as icons 8. Each icon 8 is associated with a text 9 informing the user of the block type. In the offline view (FIG. 2A), the blocks that are stored in the programming device 1 but not in the automation device 4 are provided with an identifier 10. This offline view further displays those software blocks stored in the programming device—the blocks being provided with an identifier 11—that do not match the blocks stored in the automation device 4.

In the online view (FIG. 2B), during open-loop control of the automation device 4, the software blocks stored in the automation device are displayed on the display unit 2. The software blocks that are not stored in the programming device are given an identifier 12.

The above description of the preferred embodiments has been given by way of example. From the disclosure given, those skilled in the art will not only understand the present invention and its attendant advantages, but will also find apparent various changes and modifications to the structures and methods disclosed. The applicant seeks, therefore, to cover all such changes and modifications as fall within the spirit and scope of the invention, as defined by the appended claims, and equivalents thereof.

What is claimed is:

1. Programming device with a software tool for creating a control program in accordance with a control problem to be solved, wherein a plurality of software blocks are stored in the programming device, the control program includes at least one of the software blocks, the control program is configured to be transmitted from the programming device to an automation device, to be stored in the automation device, and to be run on the automation device in order to control a technical process, and wherein the programming device comprises:
  means for recognizing the software blocks that are stored in the programming device,
  means for recognizing the software blocks that are stored in the automation device,
  means for comparing the software blocks stored in the programming device with the software blocks stored in the automation device, and
  means for displaying the result of the comparison.

2. Programming device as claimed in claim 1, wherein said display means display the software blocks stored in the programming device in a first view on a display unit of the programming device, and wherein said display means identify the software blocks that are not stored in the automation device.

3. Programming device as claimed in claim 2, wherein said display means display the software blocks stored in the programming device in a first view on a display unit of the programming device, and wherein said display means identify the software blocks that do not match the software blocks that are stored in the automation device.

4. Programming device as claimed in claim 1, wherein, during open-loop control, said display means display the software blocks stored in the automation device in a second view on the display unit, and wherein said display means identify the software blocks that are not stored in the programming device.

5. Method for creating a control program with a programming device having a software tool, comprising:

storing a plurality of software blocks in the programming device, producing the control program using at least one of the software blocks, transmitting the control program from the programming device to an automation device, and storing the transmitted control program in the automation device, recognizing the software blocks that are stored in the programming device, recognizing the software blocks that are stored in the automation device, comparing the software blocks recognized as stored in the programming device with the software blocks recognized as stored in the automation device, and displaying a result of said comparing.

6. An apparatus, comprising:

an automation device;

a programming device with a software tool, a plurality of software blocks stored in the programming device, a control program including at least one of the software blocks and stored on the programming device and the automation device, wherein the programming device comprises:
  a component recognizing the software blocks that are stored in the programming device,
  a component recognizing the software blocks of the control program that are stored in the automation device,
  a component comparing the software blocks stored in the programming device with the software blocks stored in the automation device, and
  a component displaying an output of the comparing component.

7. The apparatus according to claim 6, wherein the component displaying the output of the comparing component identifies the software blocks that are stored in the programming device but not stored in the automation device and the software blocks that are stored in both the automation device and the programming device.

8. The apparatus according to claim 7, wherein the programming device generates a new control program comprising at least some of the software blocks stored in both the automation device and the programming device and at least some of the software blocks stored only in the programming device.

9. The apparatus according to claim 8, wherein the generated new control program is loaded into the automation device by loading only the software blocks not stored in the automation device.

10. The apparatus according to claim 8, wherein the generated new control program is transferred to the automation device, and wherein, in said transfer, the software blocks already stored in the automation device are skipped.

* * * * *